United States Patent
Gaucher et al.

(10) Patent No.: US 9,483,582 B2
(45) Date of Patent: Nov. 1, 2016

(54) IDENTIFICATION AND VERIFICATION OF FACTUAL ASSERTIONS IN NATURAL LANGUAGE

(71) Applicant: International Business Machines Corporation, Armonk, NY (US)

(72) Inventors: Brian P. Gaucher, Brookfield, CT (US); Dario Gil, Katonah, NY (US); Jeffrey O. Kephart, Cortlandt Manor, NY (US); Jonathan Lenchner, North Salem, NY (US); David O. S. Melville, New York, NY (US); John M. Prager, Pomona, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 14/484,489

(22) Filed: Sep. 12, 2014

(65) Prior Publication Data

US 2016/0078149 A1  Mar. 17, 2016

(51) Int. Cl.
*G10L 15/18* (2013.01)
*G06F 17/30* (2006.01)
*G10L 15/19* (2013.01)

(52) U.S. Cl.
CPC ..... *G06F 17/30976* (2013.01); *G10L 15/1815* (2013.01); *G10L 15/1822* (2013.01); *G10L 15/19* (2013.01)

(58) Field of Classification Search
CPC ............... G06F 17/27; G06F 17/2705; G06F 17/2715; G06F 17/2765; G06F 17/2785; G06F 17/279; G06F 17/28; G06F 17/2854; G06F 17/2881; G06F 17/30; G10L 15/00; G10L 15/01; G10L 15/08; G10L 15/18; G10L 15/1815; G10L 15/1822; G10L 15/24; G10L 15/26
USPC .................... 704/235, 231, 251, 1, 4, 9, 257
See application file for complete search history.

(56) References Cited

U.S. PATENT DOCUMENTS

| | | | |
|---|---|---|---|
| 8,086,557 B2 | 12/2011 | Ait-Mokhtar et al. | |
| 8,185,448 B1 | 5/2012 | Myslinski | |
| 8,224,802 B2 | 7/2012 | Hogue | |
| 8,229,795 B1 | 7/2012 | Myslinski | |
| 8,583,509 B1 | 11/2013 | Myslinski | |
| 2002/0173960 A1* | 11/2002 | Ross ...................... | G10L 15/22 704/257 |
| 2003/0210249 A1 | 11/2003 | Simske | |
| 2004/0122846 A1 | 6/2004 | Chess et al. | |
| 2012/0078826 A1 | 3/2012 | Ferrucci et al. | |
| 2013/0198196 A1 | 8/2013 | Myslinski | |

(Continued)

OTHER PUBLICATIONS

Schultz, "Truth Goggles, a credibility layer of the Internet", http://slifty.com/projects/truth-goggles/, Oct. 29, 2012, MIT Media Lab, accessed on Jan. 17, 2014, pp. 1-2.

(Continued)

*Primary Examiner* — Qi Han
(74) *Attorney, Agent, or Firm* — Kristofer L. Haggerty; Kevin Jordan (57) ABSTRACT

A system for verifying factual assertions in natural language. Receiving a text input. Identifying, a verifiable factual statement in the text. Forming a query based on the verifiable factual assertion. Searching a corpus based on the query. Determining the veracity of verifiable factual assertion based on the search results.

19 Claims, 6 Drawing Sheets

(56) References Cited

U.S. PATENT DOCUMENTS

| | | |
|---|---|---|
| 2013/0268519 A1 | 10/2013 | Cucerzan et al. |
| 2013/0308920 A1 | 11/2013 | Myslinski |
| 2014/0032574 A1* | 1/2014 | Khan ............... G06F 17/30424 707/754 |
| 2015/0248736 A1* | 9/2015 | Myslinski ............ G06Q 10/06 705/319 |

OTHER PUBLICATIONS

Truth Teller Team, "Announcing Truth Teller beta, a better way to watch political speech", http://www.washingtonpost.com/blogs/ask-the-post/wp/2013/09/25/announcing-truth-teller-beta-a-better-way-to-watch-political-speech/, Sep. 25, 2013, washingtonpost.com, accessed on Jan. 17, 2014, pp. 1-2.

Wikipedia, The Free Encyclopedia, "Query expansion", http://en.wikipedia.org/wiki/Query_expansion, accessed on Feb. 12, 2014, pp. 1-3.

"Pierre-Paul pick leads Giants to 4th straight", http://sportsillustrated.cnn.com/football/nfl/gameflash/2013/11/17/5586/, SI.COM, accessed on Feb. 12, 2014, pp. 1-2.

Ferenstein, "Realtime Political Fact-Checking Becomes a Reality With WaPo's 'Truth Teller'", http://techcrunch.com/2013/01/29/realtime-political-fact-checking-becomes-a-reality-with-wapos-truth-teller/, accessed on Feb. 12, 2014, pp. 1-14.

Haik, "Debuting Truth Teller from the Washington Post; Real-time lie detection service at your service (not quite yet)", Jan. 29, 2013, http://www.knightfoundation.org/blogs/knightblog/2013/1/29/debuting-truth-teller-washington-post-real-time-lie-detection-service-your-service-not-quite-yet/, accessed on Sep. 9, 2014, pp. 1-2.

Phelps, "Are you sure that's true? Truth Goggles tackles fishy claims at the moment of consumption", http://www.niemanlab.org/2012/07/are-you-sure-thats-true-truth-goggles-tackles-fishy-claims-at-the-moment-of-consumption/, accessed on Sep. 9, 2014, Neiman Journalism Lab, pp. 1-5.

* cited by examiner

IDENTIFICATION AND VERIFICATION OF FACTUAL ASSERTIONS IN NATURAL LANGUAGE

BACKGROUND

The present invention relates generally to the signal processing of natural language, and more particularly to identifying factual statements in natural language, and determining the veracity of these factual statements.

There are many circumstances where it is useful to quickly verify factual assertions, such as business meetings, technical assessments or financial consultations. During these interactions, factual assertions often support the decision making process. Many factual assertions are not verified prior to making a decision. One way to verify a factual assertion may be to use a search engine and do an analysis of the documents returned pertaining to the assertion. Such an option is typically not viable in a fast-paced business meeting. Moreover, using a search engine in this capacity during a business meeting may communicate distrust or lack of interest.

SUMMARY

Embodiments of the present invention disclose a method, computer program product, and system for identifying and verifying factual assertions in natural language. A computer receives a text input. Computer identifies a verifiable factual assertion within the text. Based on the identified factual assertion questions are formed. A corpus is searched based on each query. Based on the answer results the veracity of the factual assertions is determined.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In a setting where decisions are based on factual assertions, verification of the assertions may be desired. During a business meeting, facts may be asserted, and often, based on such factual assertions, business decisions may be made. Verification of factual assertions in this nearly instant exchange of information may prove difficult. For example, a company executive may be forced to rely solely on assertions of his company's officers to reach a business decision. Manually verifying asserted facts during a meeting may interrupt the flow of the exchange, or suggest a lack of confidence in the speaker. On the other hand, relying on erroneous factual assertions may result in reaching a poor decision. It may be advantageous to verify such factual assertions in order to, for example, form a better basis for decision making.

Embodiments of the present invention generally describe a system that first identifies factual assertions and then determines the veracity of these assertions, as made, for example, during a business meeting. The fact checking system may identify factual assertions made in natural language spoken at a meeting and verify them in near real time. The fact checking system may convert all spoken language into text, which may be analyzed to identify factual assertions. A query is formed, based on a factual assertion, which is passed, for example, to a search engine. The analysis of the search results, based on aggregation functions determines a level of veracity of the factual assertion.

Figure 1:
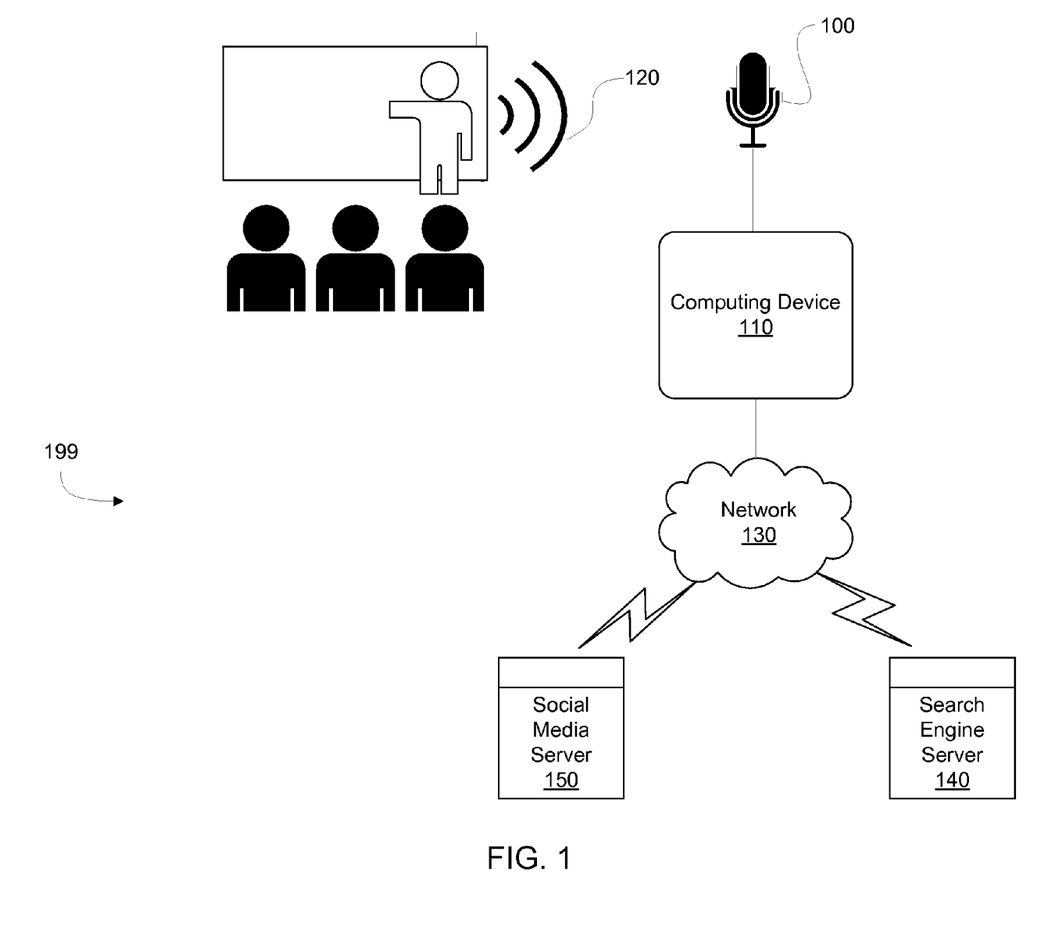
FIG. 1 is a schematic block diagram of a fact checking system environment, in accordance with an embodiment of the invention.

FIG. 1 is a schematic block diagram of a fact checking environment 199, in accordance with an embodiment of the invention. Fact checking environment 199 includes meeting participants 120, a computing device 110, audio input device 100, a search engine server 140, and a social media server 150, all interconnected over a network 130.

Network 130 can be, for example, a local area network (LAN), a wide area network (WAN) such as the Internet, or a combination of the two, and can include wired or wireless connections. In general, a network 130 can be any combination of connections and protocols that will support communication via various channels between a computing device 110, a search engine server 140, and a social media server 150, in accordance with an embodiment of the invention. One example of a network 130 may be a company's intranet or the Internet.

Meeting participants 120 represent, for example, a plurality of speakers participating in a natural language exchange within fact checking environment 199. Audio input device 100 detects the spoken natural language from meeting participants 120. Audio input device 100 may be any transducer or sensor, which converts sounds into electrical signals, in accordance with embodiments of the invention. For example, audio input device 100 may be a microphone configured to receive an input sound signal from meeting participants 120 and amplify the frequencies corresponding to human voice while diminishing others, in accordance with embodiments of the invention. Although FIG. 1 illustrates a single audio input device 100, multiple audio input devices 100 may be used to detect the voice signals from meeting participants 120.

In one embodiment, the invention could be implemented in a room environment. In such an implementation, a room environment such as a company meeting room may contain a set of one or more microphones within, to monitor natural speech along with computer devices used to analyze the natural speech. It is important to note that the computing operations such as transcribing, parsing and searching may be performed remotely via cloud computing. The microphone(s) may receive audio and convert into electrical signals that are processed and sent to a transcription module 200 (shown in FIG. 2), which may contain a speech transcription engine used for converting the audio data into text. The microphone(s) may be dedicated to the room environment, or may be associated with mobile devices that participants bring into the environment and connect to a network within the room environment. Monitoring within a space may be continuous where the microphone(s) collect and send audio signals without any user control or may be turned on or off based on user's preference. In one embodiment the user or group of users may control when the invention monitors natural speech within the space.

A computing device 110, the operation of which is described in more detail below, receives input from audio input device 100. Computing device 110 may be a laptop computer, tablet computer, netbook computer, personal computer (PC), a desktop computer, a personal digital assistant (PDA), a smart phone, or any programmable electronic device capable of communicating with other devices, and storing and transmitting data, in accordance with an embodiment of the invention.

In one embodiment of the invention, the processing of the computing device 110 may be done remotely via cloud computing or a remote server application. In such an embodiment, the operation and computational aspects of the invention may be done outside the room being monitored. Utilizing such implementation may lower the user's processing load and limit the bandwith usage by the invention as most of the computing and searching would be performed at a remote location.

Search engine server 140 represents a server application that receives search queries, and returns, for example, documents or website URLs based on a search query input. In one exemplary embodiment, search engine server 140 receives search requests from computing device 110, and returns the results of the requests to the computing device. In various embodiments, search engine server 140 may be, for example, a publicly available search engine accessed, for example, over the Internet. In other embodiments, search engine 140 may be a server application that searches a proprietary corpus of information, or a combination of public and proprietary search engines.

Social media server 150 represents one or more publically available social media applications, such as social networking, microblogging services, or other forms of electronic communications. In one embodiment of the invention, which will be described in more detail below, factual assertions may be verified with social media. For example, a query related to a factual assertion may be posted to one or more social media applications by computing device 110. Results received from the query may be analyzed to determine the veracity of the factual assertion.

Figure 2:
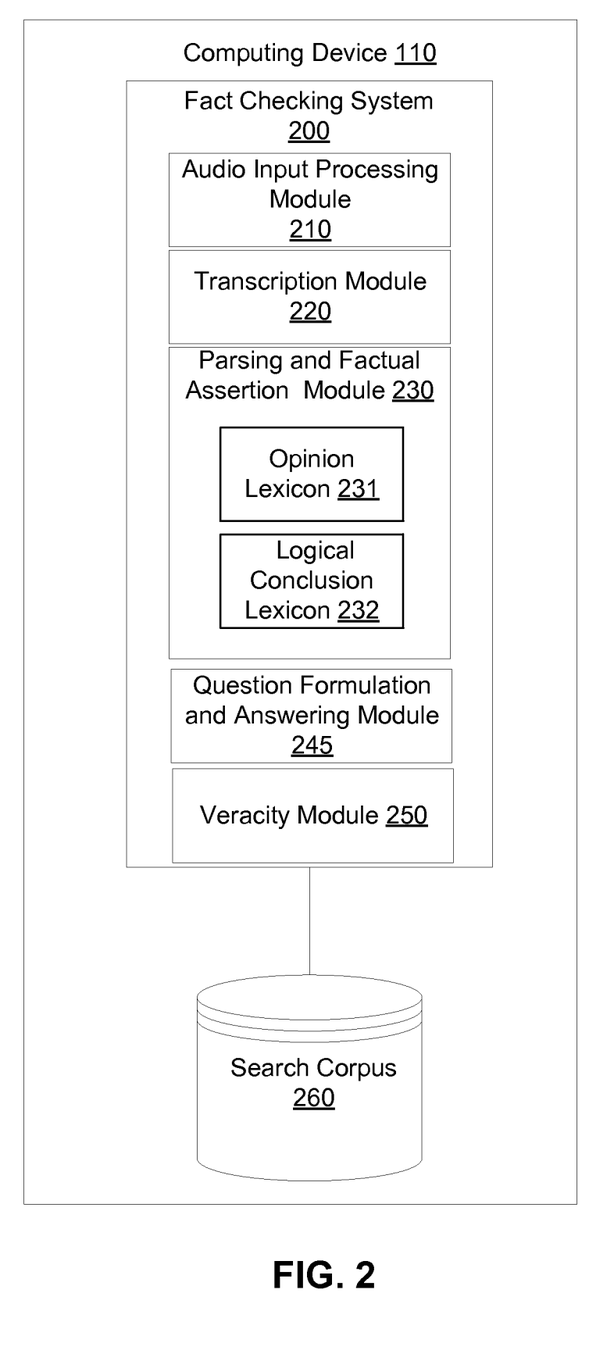
FIG. 2 is a schematic block diagram of a fact checking system within the environment of FIG. 1, in accordance with an embodiment of the present invention.

FIG. 2 is a schematic block diagram of the components of a computer system 200, in accordance with an embodiment of the present invention. Computer system 200 includes audio input processing module 210, a transcription module 220, a parsing and factual assertion module 230 containing an opinion lexicon 231 and a logical conclusion lexicon 232, a question formulation and answering module 245, a veracity module 250, and a search corpus 260.

Search Corpus 260 represents any collection of searchable textual data. For example, such document collections may encompass; private document collections, public document collections, company documents that are behind a corporate firewall, and structured data stores found in a database or resource description framework store.

Figure 5:
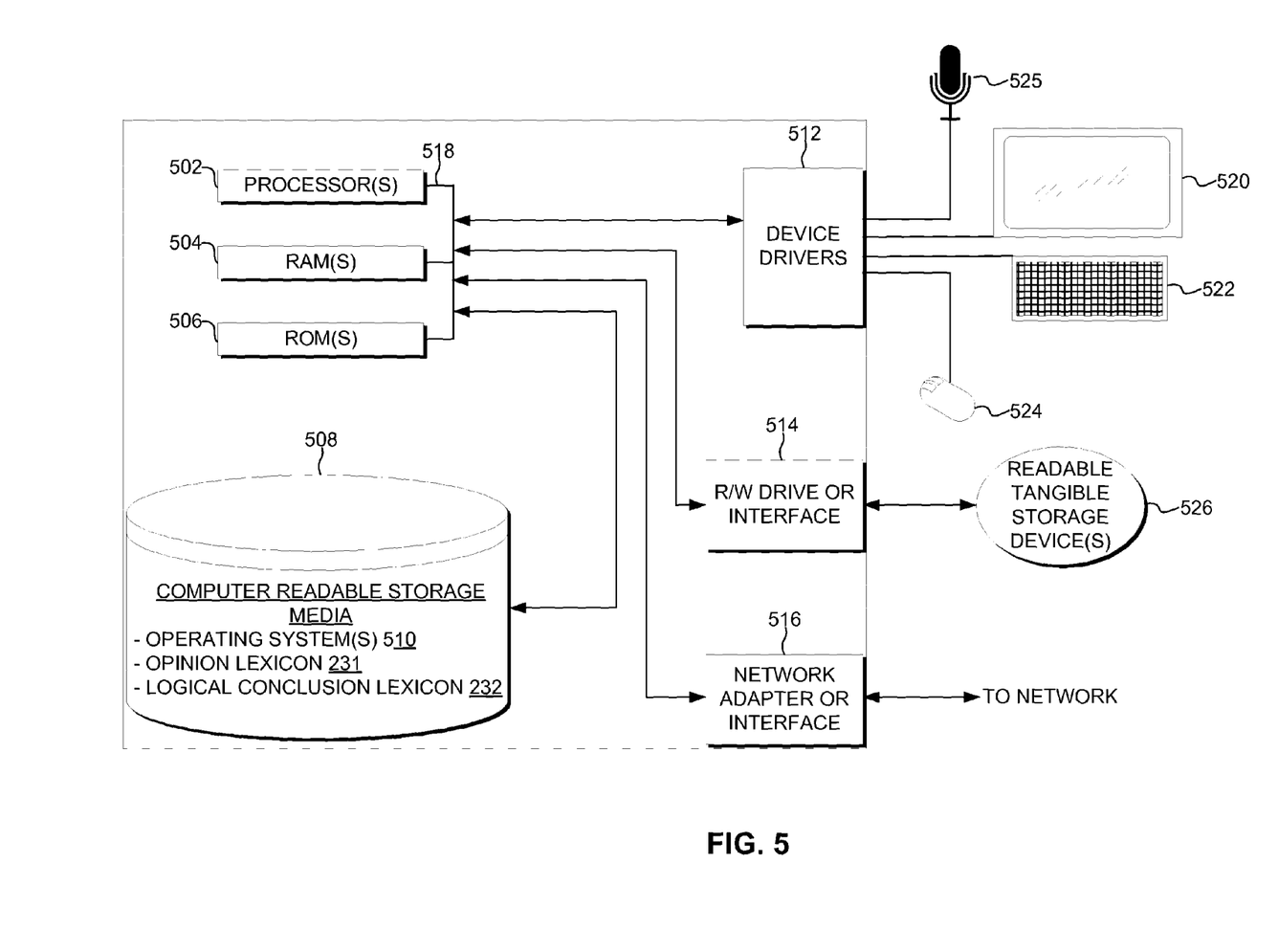
FIG. 5 is a block diagram of internal and external components within the computing system of FIG. 1, in accordance with an embodiment of the present invention.

Audio input processing module 210 represents an interface, for example, an audio interface card, that receives audio data from audio input device 100 representing natural language exchanges that occur between meeting participants 120, and processes the audio data into digital data. In an exemplary embodiment of the invention, audio input processing module 210 may record the digital audio data to a storage device, for example, tangible storage device 508 (FIG. 5). In certain embodiments of the invention, audio input processing module 210 may include a signal broadcasting circuit for transmitting audio signals sent by the audio input device 100.

Transcription module 220 may receive the digital audio data from audio input processing module 210, and transcribe the digital data into a text format. The transcribed text may be recorded onto a storage device. In an exemplary embodiment, transcription module 220 may utilize vocabulary based voice recognition software. Such software may utilize a voice recognition engine, which translates audio files into text based on a vocabulary database. For example, transcription module 220 may receive digital audio data of a natural language exchange from audio input processing module 210. A voice recognition engine within transcription module 220 may isolate the speech component of the digital audio data from background and other extraneous noise, and match the speech component against an acoustic model. Based on the acoustic model, a most likely transcription of the digital audio data into text is produced. In various embodiments, the voice recognition engine may be any of a number of commercially available or open source products that will transcribe audio digital data into text, in accordance with embodiments of the invention.

Parsing and factual assertion module 230, the operation of which is described in more detail below in relation to FIG. 3, may receive the text produced by transcription module 220, and may provide deep linguistic analysis, or deep parsing, of transcribed text, and from this parsing, decide whether the sentence constitutes a verifiable factual assertion. Deep parsing is a form of linguistic analysis, which utilizes logical relations based on the structure of a fragment of text and seeks to generate semantic clues on a network of syntactic relationships. Deep parsing involves a detailed analysis in which not only are the words in a sentence assigned to syntactic categories, but the relationships between the words are also identified. Deep parsing methods use word tagging and extensive rules to produce detailed analyses of the relations among the words making up a sentence.

In various embodiments of the invention, parsing and factual assertion module 230 may utilize multiple deep parsing components. An exemplary embodiment may include a Slot Grammar parser, which produces a grammatical parse tree containing both surface and deep structures of a sentence.

Figure 3A:
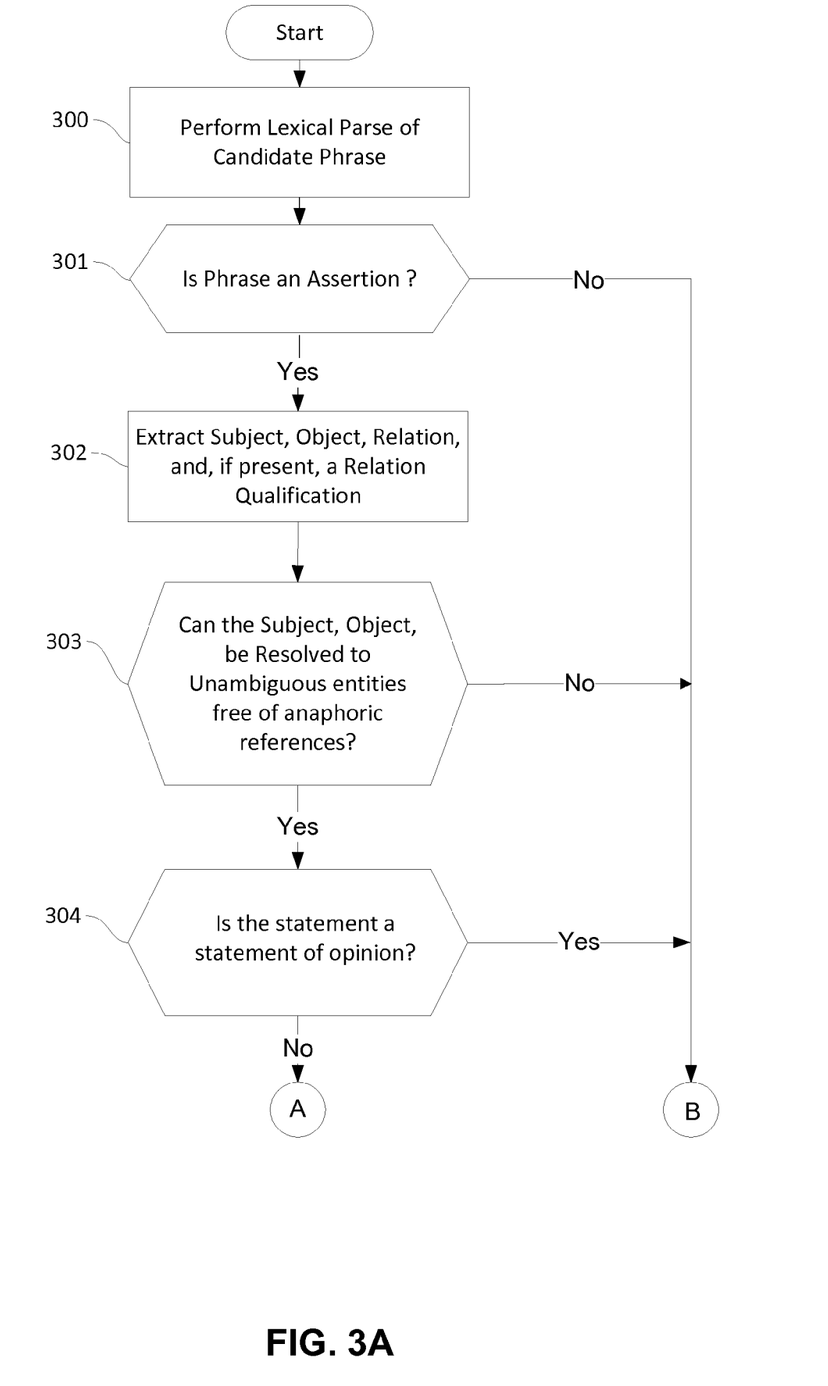
FIGS. 3A and 3B are two pieces of a flowchart depicting operational steps of a parsing and factual assertion module, in accordance with an embodiment of the present invention.
Figure 3B:
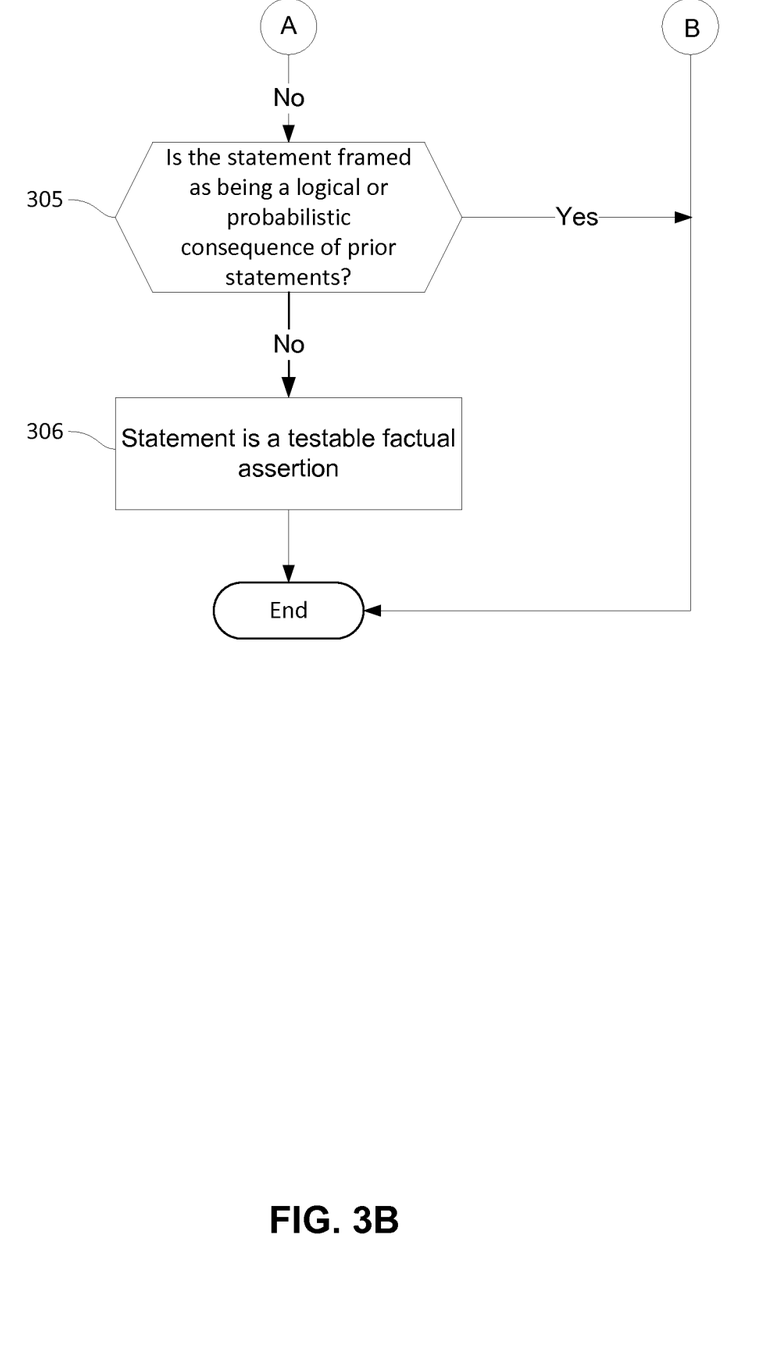

FIGS. 3A and 3B are two pieces of a flowchart depicting operational steps of a parsing and factual assertion module 230, in accordance with an embodiment of the present invention.

Parsing and factual assertion module 230, may use a grammatical parse tree, or other lexical parse apparatus to parse text. In one embodiment of the invention, parsing and factual assertion module 230 may perform a lexical parse of a candidate phrase (step 300).

Whether the candidate phrase is an assertion may be determined by analyzing the punctuation of the phrase or structure of the phase and filtering phrases that are clearly not factual assertions (step 301). If parsing and factual assertion module 230, detects a grammatical mark or structure suggesting a question it will reject it from further analysis (decision step 301, "No" branch). If the parsing and factual assertion module 230 determines that the phrase is a potential factual assertion, it continues the analysis of the phrase (decision step 301, "Yes" branch).

In step 302, parsing and factual assertion module 230 extracts subject, object, relation and any relation qualification. A subject and an object may be determined based on their syntactic grammatical role. The subject usually represents the actor, and the object as the thing being acted upon. The relation is the manner in which the subject acts upon the object, and an optional relation qualification is some qualification of this relation, typically involving adjectives and/or adverbs. Once the sentence or phrase is parsed, determined to be an assertion, and the subject, object, relation and relation qualification are identified, step 303 determines if the subject and object can be resolved to unambiguous entities that are free of anaphoric references. For example, many sentences use pronouns such as this, that, these, it, and so on. Such pronouns are called anaphora because their resolution cannot be resolved without looking at surrounding text. In this step, an attempt is made to replace any anaphora with their referents. Also attempts may be made to resolve "soft" referents, such as "yesterday", to hard referents, such as to absolute dates. An attempt is also made to replace partial person or place names, based on context, with complete person or place names for example, replacing "Bush," with "George H. Bush," or "New York" with "New York City". If the subject and object cannot be resolved the process stops and the statement is not a candidate for being a verifiable factual assertion (decision step 303, "No" branch). If the subject and object can be resolved (decision step 303, "Yes" branch), the process attempts to determine if the statement is a statement of opinion.

Step 304 determines whether phrases identified as containing triples or 4-tuples include a qualification indicating that the assertion is a statement of opinion rather than an assertion of fact. A triple may be a list of elements used to determine whether a phrase is an assertion. Such elements may consist of a subject, a predicate, and an object. In such capacity, the subject usually appears before the predicate to show either what the phrase is about, or who or what performs the action. The predicate typically comes after the subject to establish the connection between the subject, the object, and the meaning of the phrase. Finally, the object is the recipient of the action of the phrase. Phrases such as "it seems to me that . . . " and "in my opinion . . . " are indicative of stated opinions. Also, qualitative as opposed to quantitative qualifications, tend to be indicative of stated opinions. For example, whether or not someone was "heavily" recruited depends on what is considered as the threshold for considering someone to be so recruited. An opinion lexicon 231 located in a parsing and factual assertion module 230 may facilitate this analysis.

If the parsing and factual assertion module 230 finds a phrase containing a triple, or one of the two described 4-tuples with a qualification identified as assertions of opinion, parsing and factual assertion module 230 assertion will identify the phrase as a statement of opinion (decision step 304, "Yes" branch) rather than a factual assertion. Such phrases will be disregarded from further analysis because the assertion is considered a personal opinion and cannot be verified.

If the phrase is determined not to be a statement of opinion (decision step 304, "No" branch), factual assertion filtering and parsing module 230 determines whether identified phrases containing triples and 4-tuples include a qualification indicating that the statement is a probabilistic or logical consequence of prior assertions (decision step 305). Phrases such as; "as a result . . . ", "therefore," and "as a necessary consequence . . . " may indicate that the assertion is not strictly speaking a factual assertion but deemed to be a logical or likely consequence of prior assertions or of prior assumptions. Such phrases are disregarded from further analysis because they are not verifiable factual assertions, (decision step 305, "Yes" branch). This analysis may be facilitated by a logical conclusion lexicon 232 located within parsing and factual assertion module 230 stored on, for example, storage device 508. If the statement is not framed as being a logical or probabilistic consequence of a prior statement (decision step 305, "No" branch), then the statement is considered a verifiable factual assertion (step 306) and control passes to question formulation and answering module 245.

Returning to FIG. 2, the question formulation and answering module 245 takes the verifiable factual assertion and formulates a question or a set of questions that the assertion implicitly answers. An example of the implementation of the question formulation and answering module 245 may be IBM Watson, (or "Watson") which is an artificial intelligence computer system capable of answering questions posed in natural language. Additional details of the Watson architecture are described in "This is Watson", *IBM Journal of Research and Development*, Volume 56, Issue 3.4, 2012, hereby incorporated by reference in its entirety. In order to be verified as a true factual assertion, the assertion must be deemed to correctly answer each question by the question answering module. Details of how these questions are formulated are discussed in greater detail in reference to the discussion surrounding FIG. 4 below.

Figure 4:
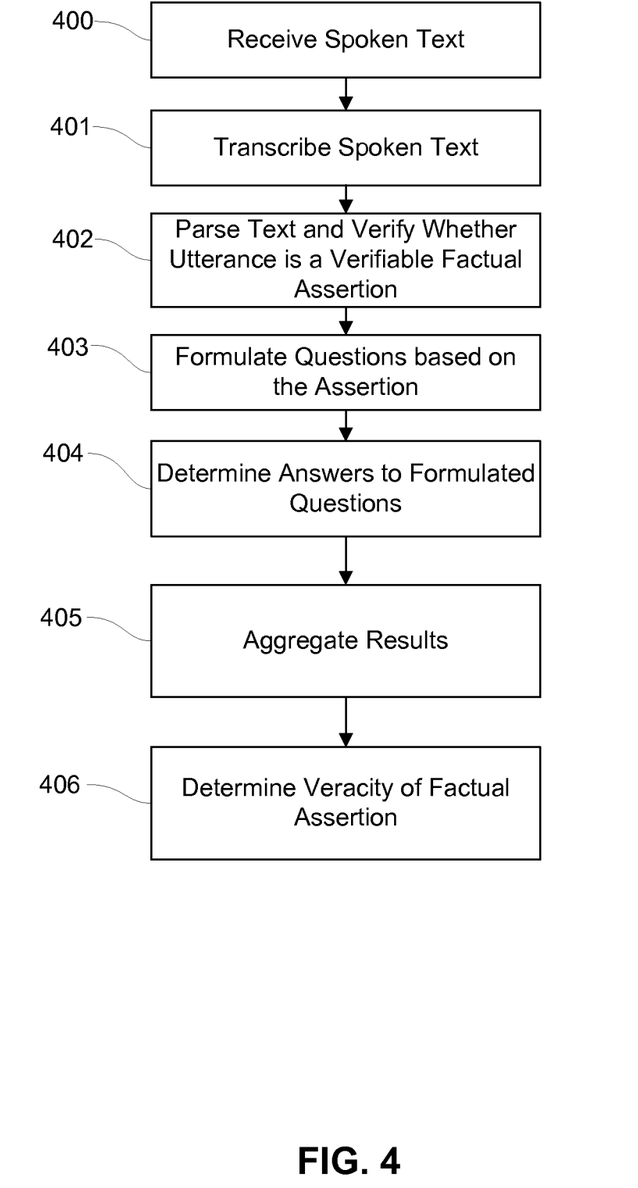
FIG. 4 is a flowchart depicting operational steps of a fact checking system, in accordance with an embodiment of the present invention.

FIG. 4 is a flowchart depicting operational steps of a fact checking system 200, in accordance with an embodiment of the present invention. Audio Input Processing Module 210 receives audio data from audio input device 100 (step 400). Transcription Module 220 transcribes the audio data to text (step 401). Such transcription may be performed by using various methods. One such method may utilize acoustic modeling. An acoustic model utilizes prerecorded speech coupled with text transcriptions to create a statistical representation. Such statistical representation may be compared to actual audio data to recognize speech and covert it to a text format. Parsing and factual assertion module 230 parses the transcribed text and verifies whether statement is a verifiable factual assertion (step 402).

In step 403 questions are formulated based on the verifiable factual assertion. One method for formulating such questions is to use a question answering approach. Using this method question formulation and answering module 245 may replace the nouns or noun phrases in the associated assertion with appropriate who, what or where questions. In the sentence "Bill Clinton was president of the United States from 1993 until 2001", the question formulation and answering module 245 may create entity recognizers capable of identifying that "Bill Clinton" is a person. By identifying "Bill Clinton" as a person and as the subject of the sentence question formulation and answering module 245 may then replace "Bill Clinton" with "Who" to obtain a question. Similarly, question formulation and answering module 245 may recognize that "president of the United States" is an office, which can be the subject of a "what" question.

Once questions are formulated, the question formulation and answering module 245 identifies potential answers to the formulated questions, along with associated confidences in these answers, in step 404. The question answering step 404 may first comprise searching a corpus, or other textual or structured repository in order to assemble a list of documents and passages relevant to the question. A syntactic analysis of the question may then be performed to identify the likely answer type or types. Exemplary answer types may include "U.S. presidents" or "heads of state," corresponding to, for example, the exemplary questions "Who was president of the United States from 1993 until 2001?" Once one or more answer types are identified, a further step may be to scan the documents and/or passages obtained from the document search step to identify candidate answers, in other words instances of the one or more answer types that are either explicitly or implicitly mentioned in the documents or passages. This step or the former one may utilize so-called type coercion techniques. Additional details regarding type coercion are described in "Typing candidate answers using type coercion", *IBM Journal of Research and Development*, Volume 56, Issue 3.4, 2012, and in "A framework for merging and ranking of answers in DeepQA", *IBM*

*Journal of Research and Development*, Volume 56, Issue 3.4, 2012, and are hereby incorporated by reference in its entirety. Finally the candidate answers may be assigned confidences based on the assessed strength of evidence or other criteria. The numerical score indicating the strength of evidence may be calculated by one or more statistical answer ranking algorithms to assign a confidence value to each candidate answer and to rank the answers according to such values.

One such statistical answer ranking algorithm may determine the degree to which the phrase within the original factual statement, previously replaced by a relative pronoun, can be extracted from passages supporting the different candidate answers. Using the previous question example, "Who was president of the United States from 1993 until 2001?", question formulation and answering module 245 may search the passages supporting the various candidate answers and gather statistics regarding the degree of syntactic correspondence between phrases supporting different answers and this question.

In some embodiments of the invention, criteria such as popularity of answers, trustworthiness of sources, and others, may be used by the question formulation and answering module 245 to score the candidate answers.

Utilizing such exemplary methods of scoring candidate answers as discussed above, the results of the question formulation and answering module 245, as applied to each question, are sent to veracity module 250 and are aggregated (step 405). The veracity module 250 may be implemented in a variety of ways. In one embodiment, if the highest ranked answers to all questions as received from the question formulation and answering module 245 agree with the answers provided by the verifiable factual assertion, and optionally exceed some threshold of confidence, the factual assertion is deemed true. If the answer to at least one question differs from that asserted in the factual assertion, the factual assertion is deemed false. Finally, if one or more of the component questions cannot be answered with high enough confidence, while the factual assertion agrees with the answers to all other questions, the truth of the factual assertion is deemed not verifiable. Other embodiments may implement the veracity module differently, for example, determining the factual assertion is false only if more than 50% of the top answers do not match the assertion. Persons of skill in the art will be able to create many variations of the veracity module 250 without departing from the scope of the invention. However it is implemented, the veracity module 250 thus outputs the determined veracity (step 406) of the asserted factual assertion. The veracity determination along with the extracted factual statement can be displayed by use of graphical representation or other techniques within display screen 520.

The veracity determination may be presented to the user or users in a variety of ways. It may include a graphical representation of the determination and/or a numerical confidence level. In one embodiment, the determination of whether the statement is determined to be true may be displayed on a display screen 520. The determination may be viewed by all parties taking part in the meeting, for example as displayed on projection device. In another embodiment, the user initiating fact verification may wish to keep the determination from the meeting participants. In such a case the determination maybe provided privately to the user via a personal mobile device, ear piece device, or other device that is associated with the user.

FIG. 5 depicts a block diagram of components of fact checking system of FIG. 1, in accordance with an embodiment of the present invention. It should be appreciated that FIG. 5 provides only an illustration of one implementation and does not imply any limitations with regard to the environments in which different embodiments may be implemented.

Computing device 110 can include one or more processors 502, one or more computer-readable RAMs 504, one or more computer-readable ROMs 506, one or more tangible storage devices 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within a system.

One or more operating systems 510, opinion lexicon 231, logical conclusion lexicon 232 are stored on one or more of the computer-readable tangible storage devices 508 for execution by one or more of the processors 502 via one or more of the respective RAMs 504 (which typically include cache memory). In the illustrated embodiment, each of the computer-readable tangible storage devices 508 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 514 to read from and write to one or more portable computer-readable tangible storage devices 526. Opinion lexicon 231 of computer system 200 can be stored on one or more of the portable computer-readable tangible storage devices 526, read via the respective R/W drive or interface 514 and loaded into the respective computer-readable tangible storage device 508.

Logical conclusion lexicon 232 of computing device 110 can be stored on one or more of the portable computer-readable tangible storage devices 526, read via the respective R/W drive or interface 514 and loaded into the respective computer-readable tangible storage device 508.

Computing device 110 can also include a network adapter or interface 516, such as a TCP/IP adapter card or wireless communication adapter (such as a 4G wireless communication adapter using OFDMA technology). Opinion lexicon 231 on computing device 110 can be downloaded to the computing device from an external computer or external storage device via a network (for example, the Internet, a local area network or other, wide area network or wireless network) and network adapter or interface 516. Logical conclusion lexicon 232 on computing device 110 can be downloaded to the computing device from an external computer or external storage device via a network (for example, the Internet, a local area network or other, wide area network or wireless network) and network adapter or interface 516. From the network adapter or interface 516, the programs are loaded into the computer-readable tangible storage device 508. The network may comprise copper wires, optical fibers, wireless transmission, routers, firewalls, switches, gateway computers and/or edge servers.

Computing device 110 can also include a display screen 520, a keyboard or keypad 522, a microphone 525 and a computer mouse or touchpad 524. Device drivers 512 interface to display screen 520 for imaging, to keyboard or keypad 522, to microphone 525, to computer mouse or touchpad 524, and/or to display screen 520 for pressure sensing of alphanumeric character entry and user selections. The device drivers 512, R/W drive or interface 514 and network adapter or interface 516 can comprise hardware and software (stored in computer-readable tangible storage device 508 and/or ROM 506).

Although an exemplary embodiment of the invention has been described in the context of verifying factual assertions in a business meeting environment, those of skill in the art will recognize that the inventive concepts disclosed may be applied to other spoken communications. For example, an embodiment may be implemented in a mobile telephone environment where factual assertions are determined between individual users.

In this implementation, factual assertions may be determined, for example, by a fact checking system embodied within a mobile environment. The factual assertions may be verified within a mobile environment such as private conversations between individuals or a business consultations taking place outside of an office setting. The functionality to determine factual assertions may be implemented, by conducting a transcription of the conversation by the mobile telephone. Performing a deep parse tree analysis of the spoken text and query expansion of the query. Utilizing a search corpus to conduct the expanded query search, where such corpus may be a web search or a search of a database to match or negate factual assertions. Performing thorough deep parse tree analysis of the query results and determining the veracity of the factual assertion through aggregation.

Another embodiment may be implemented in a social media environment. In this implementation, any verifiable factual assertion may be determined by "crowd sourcing" the verification to various social media environments. In this embodiment, any verifiable factual assertions may be posted to "trusted users" for individual verifications. Such users may be compensated for such verification based on each answer. All answered verifiable factual assertions may be later implemented into a database or a lexicon in order to improve the fact checking process. The functionality to determine veracity of a verifiable factual assertion may be implemented, for example, at the social media server, and the functionality to answer a verifiable factual assertion may be implemented at the users' computing device. Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims. All trademarks used herein are the property of their respective owners.

What is claimed is:

1. A method for verifying factual assertions in natural language, the method comprising:
   monitoring a natural language input, wherein the natural language input includes an audio input;
   processing the audio input into a digital input by an audio input processing module;
   transmitting the digital input to a transcription module;
   transcribing the digital input into a natural language text input by a speech transcription engine within the transcription module which matches the audio input to one or more acoustic models detailed by an electronic database;
   identifying a phrase within the natural language text input, wherein the phrase comprises a subject, an object, and a relation;
   determining if the phrase is a statement of opinion;
   determining if the phrase is an indication of a consequence of a prior statement;
   identifying the phrase as a factual assertion if the phase is not a statement of opinion and not an indication of a consequence of a prior statement;
   verifying the factual assertion in the natural language text input; and
   outputting a notification to a user of a result of the verification.

2. The method in accordance with claim 1, wherein:
   determining if the phrase is a statement of opinion comprises identifying a predetermined word and/or word combinations indicative of a statement of opinion; and
   determining if the phrase is an indication of a consequence of a prior statement comprises identifying a predetermined word and/or word combinations indicative of a consequence of a prior statement.

3. The method in accordance with claim 1, wherein verifying the factual assertion further comprises;
   forming a question based on the factual assertion;
   searching a corpus of information for an answer to the formed question; and
   receiving a result of the search.

4. The method in accordance with claim 3, wherein forming the questions further comprises;
   identifying relative pronouns in the factual assertion; and
   substituting the relative pronouns with nouns and noun phrases.

5. The method in accordance with claim 1, wherein verifying the factual assertion further comprises;
   comparing the result to the factual assertion, wherein the factual assertion is true when the result supports the factual assertion and the factual assertion is false if the result rejects the factual assertion and the factual assertion is inconclusive if the result neither supports or rejects the factual assertion.

6. The method in accordance with claim 5, wherein;
   comparing a number of social media responses that support the factual assertion to a number of social media responses that reject the factual assertion, wherein the greater number of social media responses that support the factual assertion as compared to the number of social media responses that reject the factual assertion indicates a higher level of veracity.

7. The method in accordance with claim 1, further comprising:
   determining if the factual assertion is ambiguous; and
   resolving the ambiguity using contextual input.

8. A computer program product for verifying factual assertions in natural language, the computer program product comprising:
   one or more computer readable storage media and program instructions stored on the one or more computer readable storage media, the program instructions comprising:
   program instructions to monitor a natural language input, wherein the natural language input includes an audio input;
   program instructions to process the audio input into a digital input by an audio input processing module;
   program instructions to transmit the digital input to a transcription module;
   program instructions to transcribe the digital input into a natural language text input by a speech transcription engine within the transcription module which matches the audio input to one or more acoustic models detailed by an electronic database;

program instructions to identify a phrase within the natural language text input, wherein the phrase comprises a subject, an object, and a relation;

program instructions to determine if the phrase is a statement of opinion;

program instructions to determine if the phrase is an indication of a consequence of a prior statement;

program instructions to identify the phrase as a factual assertion if the phase is not a statement of opinion and not an indication of a consequence of a prior statement;

program instructions to verify the factual assertion in the natural language text input; and program instructions to output a notification to a user of a result of the verification.

9. The computer program product in accordance with claim 8, wherein:

program instructions to determine if the phrase is a statement of opinion comprises program instructions to identify a predetermined word and/or word combinations indicative of a statement of opinion; and program instructions to determine if the phrase is an indication of a consequence of a prior statement comprises program instructions to identify a predetermined word and/or word combinations indicative of a consequence of a prior statement.

10. The computer program product in accordance with claim 8, wherein program instructions to verify the factual assertion further comprises;

program instructions to form a question based on the factual assertion;

program instructions to search a corpus of information for an answer to the formed question; and program instructions to receive a result of the search.

11. The computer program product in accordance with claim 10, wherein program instructions to form the questions further comprises;

program instructions to identify relative pronouns in the factual assertion; and program instructions to substitute the relative pronouns with nouns and noun phrases.

12. The computer program product in accordance with claim 8, wherein program instructions to verify the factual assertion further comprises;

program instructions to compare the result to the factual assertion, wherein the factual assertion is true when the result supports the factual assertion and the factual assertion is false if the result rejects the factual assertion and the factual assertion is inconclusive if the result neither supports or rejects the factual assertion.

13. The computer program product in accordance with claim 12, wherein;

program instructions to compare a number of social media responses that support the factual assertion to a number of social media responses that reject the factual assertion, wherein the greater number of social media responses that support the factual assertion as compared to the number of social media responses that reject the factual assertion indicates a higher level of veracity.

14. The computer program product in accordance with claim 8, further comprising:

program instructions to determine if the factual assertion is ambiguous; and program instructions to resolve the ambiguity using contextual input.

15. A computer system for verifying factual assertions in natural language, the computer system comprising:

one or more computer processors;

one or more computer readable storage media;

program instructions stored on the computer readable storage media for execution by at least one of the one or more processors, the program instructions comprising:

program instructions to monitor a natural language input, wherein the natural language input includes an audio input;

program instructions to process the audio input into a digital input by an audio input processing module;

program instructions to transmit the digital input to a transcription module;

program instructions to transcribe the digital input into a natural language text input by a speech transcription engine within the transcription module which matches the audio input to one or more acoustic models detailed by an electronic database;

program instructions to identify a phrase within the natural language text input, wherein the phrase comprises a subject, an object, and a relation;

program instructions to determine if the phrase is a statement of opinion;

program instructions to determine if the phrase is an indication of a consequence of a prior statement;

program instructions to identify the phrase as a factual assertion if the phase is not a statement of opinion and not an indication of a consequence of a prior statement;

program instructions to verify the factual assertion in the natural language text input; and program instructions to output a notification to a user of a result of the verification.

16. The computer system in accordance with claim 15, wherein:

program instructions to determine if the phrase is a statement of opinion comprises program instructions to identify a predetermined word and/or word combinations indicative of a statement of opinion; and program instructions to determine if the phrase is an indication of a consequence of a prior statement comprises program instructions to identify a predetermined word and/or word combinations indicative of a consequence of a prior statement.

17. The computer system in accordance with claim 15, wherein program instructions to verify the factual assertion further comprises;

program instructions to form a question based on the factual assertion;

program instructions to search a corpus of information for an answer to the formed question; and program instructions to receive a result of the search.

18. The computer system in accordance with claim 17, wherein program instructions to form the questions further comprises;

program instructions to identify relative pronouns in the factual assertion; and program instructions to substitute the relative pronouns with nouns and noun phrases.

19. The computer system in accordance with claim 15, wherein program instructions to verify the factual assertion further comprises;

program instructions to compare the result to the factual assertion, wherein the factual assertion is true when the result supports the factual assertion and the factual assertion is false if the result rejects the factual assertion and the factual assertion is inconclusive if the result neither supports or rejects the factual assertion.

* * * * *